(12) United States Patent
Chou et al.

(10) Patent No.: US 7,472,288 B1
(45) Date of Patent: Dec. 30, 2008

(54) PROTECTION OF PROCESSES RUNNING IN A COMPUTER SYSTEM

(75) Inventors: Tsun-Sheng Chou, Taipei (TW); Sung-Ching Lin, Taoyuan (TW); Chin-Ju Lin, Sinjhuang (TW)

(73) Assignee: Trend Micro Incorporated, Tokyo (JP)

( * ) Notice: Subject to any disclaimer, the term of this patent is extended or adjusted under 35 U.S.C. 154(b) by 845 days.

(21) Appl. No.: 10/845,650

(22) Filed: May 14, 2004

(51) Int. Cl.
*G06F 9/00* (2006.01)

(52) U.S. Cl. .................. 713/193; 713/193; 713/194; 713/187; 713/188; 713/189

(58) Field of Classification Search .............. 713/194, 713/193, 189, 188, 187
See application file for complete search history.

(56) References Cited

U.S. PATENT DOCUMENTS

| | | | |
|---|---|---|---|
| 5,442,699 A | 8/1995 | Arnold et al. | |
| 5,452,442 A | 9/1995 | Kephart | |
| 5,907,834 A | 5/1999 | Kephart et al. | |
| 6,192,512 B1 | 2/2001 | Chess | |
| 6,279,128 B1 | 8/2001 | Arnold et al. | |
| 6,622,134 B1 | 9/2003 | Sorkin | |
| 6,711,583 B2 | 3/2004 | Chess et al. | |
| 6,789,200 B1 | 9/2004 | Fiveash et al. | |
| 6,813,712 B1 | 11/2004 | Luke | |

FOREIGN PATENT DOCUMENTS

EP        1 377 892 B1    9/2004
WO   WO 02/084459 A1    10/2002

*Primary Examiner*—Thomas R Peeso
(74) *Attorney, Agent, or Firm*—Okamoto & Benedicto LLP

(57) ABSTRACT

In one embodiment, a protected process is monitored by one or more watchdog processes. Upon detection that the protected process has been abnormally terminated, the watchdog processes may initiate actions to identify and/or terminate one or more malicious processes terminating the protected process. For example, the watchdog processes may inject a detector in processes running in the computer. The detector may listen for an activity that would terminate the protected process, and report such activity to the watchdog processes. The watchdog processes may be configured to terminate malicious processes identified as abnormally terminating the protected process. Thereafter, the watchdog processes may restart the protected process.

14 Claims, 6 Drawing Sheets

PROTECTION OF PROCESSES RUNNING IN A COMPUTER SYSTEM

BACKGROUND OF THE INVENTION

1. Field of the Invention

The present invention relates generally to computer systems, and more particularly but not exclusively to techniques for combating malicious programs and processes.

2. Description of the Background Art

Malicious programs, such as computer viruses, spy wares, worms, and Trojans, pose a significant threat to computer systems. For example, a computer virus can corrupt or delete important files, send e-mails without user authorization, render a computer inoperable, or cause other types of damage to a computer. Computers may incorporate antivirus programs as a protective measure against viruses. However, an antivirus program is only effective while running in the computer. A malicious program may thus render the computer vulnerable by attacking the antivirus program first.

SUMMARY

In one embodiment, a protected process is monitored by one or more watchdog processes. Upon detection that the protected process has been abnormally terminated, the watchdog processes may initiate actions to identify and/or terminate one or more malicious processes terminating the protected process. For example, the watchdog processes may inject a detector in processes running in the computer. The detector may listen for an activity that would terminate the protected process, and report such activity to the watchdog processes. The watchdog processes may be configured to terminate malicious processes identified as abnormally terminating the protected process. Thereafter, the watchdog processes may restart the protected process.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
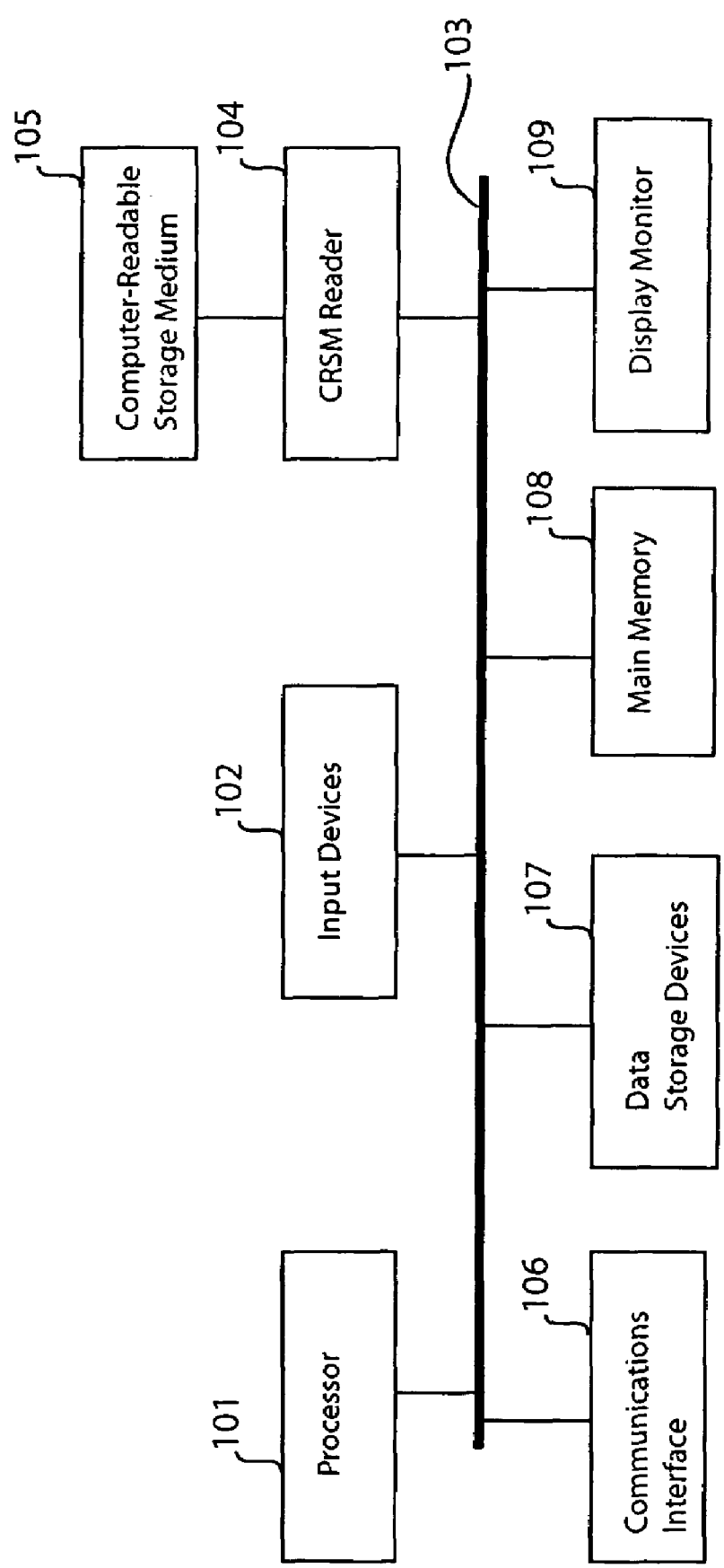
FIG. 1 schematically shows an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a desktop computer or a server computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108.

Figure 2:
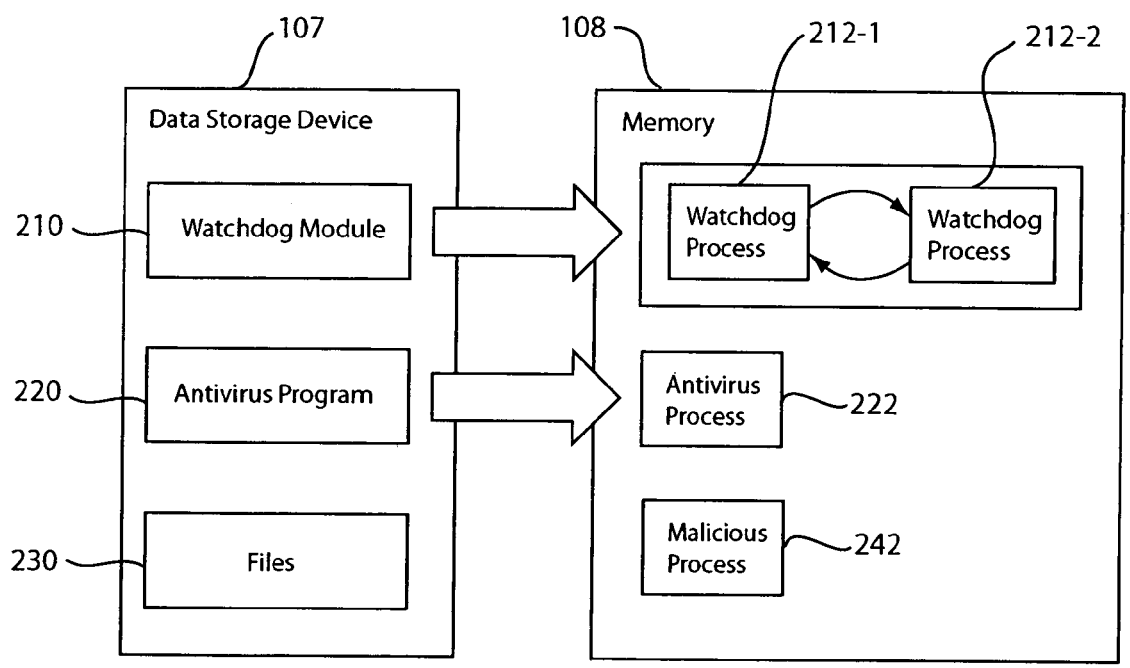
FIG. 2 schematically shows components that may be in a data storage device and a main memory in accordance with an embodiment of the present invention.

FIG. 2 schematically shows components that may be in data storage device 107 and main memory 108 in accordance with an embodiment of the present invention. Data storage device 107 may include a watchdog module 210, an antivirus program 220, and files 230. In the example of FIG. 2, watchdog module 210 and antivirus program 220 are shown as separate modules. Depending on the application, watchdog module 210 and antivirus program 220 may also be integrated as a single module and be made available from a single vendor. Watchdog module 210 may comprise computer-readable program code for protecting designated processes, such as an antivirus process 222. Watchdog module 210 may be executed by a processor 101 to run in memory 108. In the example of FIG. 2, executing watchdog module 210 creates watchdog processes 212 (i.e., 212-1 and 212-2) in memory 108. In one embodiment, each watchdog process 212 continually monitors the state of the other watchdog process 212 to insure that there is at least one watchdog process 212 running at any given time. Using the Microsoft Windows™ operating system environment as an example, watchdog processes 212 may monitor each other as follows:

Watchdog process 212-1 creates a mutex (mutual exclusion object) with a designated name, say "M1."

Watchdog process 212-2 opens the mutex M1, and get the mutex M1 using the "WaitForSingleObject" function.

Watchdog process 212-1 calls the "WaitForSingleObject" for mutex M1.

If watchdog process 212-2 has been normally terminated, watchdog process 212-2 will release the mutex M1 by calling the "ReleaseMutex" function. In that case, the "WaitForSingleObject" function call of watchdog process 212-1 for the mutex M1 will return a "WAIT_OBJECT_0."

If watchdog process 212-1 has been abnormally terminated, the "WaitForSingleObject" function call of watchdog process 212-1 for the mutex M1 will return a "WAIT_ABANDONED."

Similarly, watchdog process 212-2 may perform the just described monitoring steps for watchdog process 212-1. A watchdog process 212 may restart another watchdog process 212 that has been abnormally terminated. This helps protect the watchdog processes 212 from a malicious process 242.

Watchdog processes 212 may be configured to protect a designated process ("protected process"), such as an antivirus process 222. Watchdog processes 212 may be configured to detect and terminate malicious processes targeting protected processes. In one embodiment, watchdog processes 212 may be normally (i.e., not abnormally) closed by the protected process by way of a secured communication. The protected process may notify watchdog processes 212 to close. In response, watchdog processes 212 may terminate themselves.

Antivirus program 220 may comprise computer-readable program code for combating malicious programs and processes. Executing antivirus program 220 creates an antivirus process 222 for detecting and eradicating malicious programs and/or processes. Antivirus programs, in general, are known in the art and not further described. As previously discussed, an antivirus program 220 is only effective while running. A malicious process may disable an antivirus program 220 by terminating its processes, such as an antivirus process 222. As will be more apparent below, watchdog processes 212 may be configured to protect an antivirus process 222. Antivirus process 222 may be configured to normally close watchdog processes 212. For example, the user may activate a menu or icon to normally close antivirus process 222. In that case, antivirus process 222 will perform a normal "exit" and will notify watchdog processes 212 to also normally close.

A malicious process 242 may be a computer virus, spyware, worm, Trojan, or other type of unauthorized process. Malicious process 242 may be, but not necessarily, the result of running a malicious program embedded in a file 230 that have been infected, for example. A malicious process 242 may be designed to search out, delete, or otherwise disable an antivirus program 220. For example, a malicious process 242 may be designed to find and terminate an antivirus process 222. Doing so leaves the computer vulnerable to damaging attacks by the malicious process 242.

Files 230 may comprise data files, program files, system files, or other type of storable information. A malicious process 242 may corrupt and infect files 230 after disabling an antivirus program 220.

FIGS. 3A-3F pictorially illustrate a technique for protecting a process running in a computer in accordance with an embodiment of the present invention. In one embodiment, the technique is employed to protect processes in the Microsoft Windows™ operating system environment. It should be noted, however, that the invention is not so limited, and may also be implemented in other operating systems.

As is well known, processes of programs in the Microsoft Windows™ operating system are assigned a process ID ("pid"). For example, assuming the antivirus program 220 has a file name "antivirus.exe," the antivirus process 222 created by running "antivirus.exe" will have a unique process ID. In one embodiment, watchdog processes 212 look for the processes of antivirus program 220 and identify them by process ID. Only one antivirus process 222 is shown in FIGS. 3A-3F for clarity of illustration. Depending on the application, watchdog processes 212 may protect one or more antivirus processes. For example, in the Microsoft Windows™ operating system environment, watchdog processes 212 may utilize the "WaitForMultipleObjects" function to monitor several protected processes at the same time. Watchdog processes 212 may consult a monitoring list containing the process IDs of all protected processes.

Figure 3A:
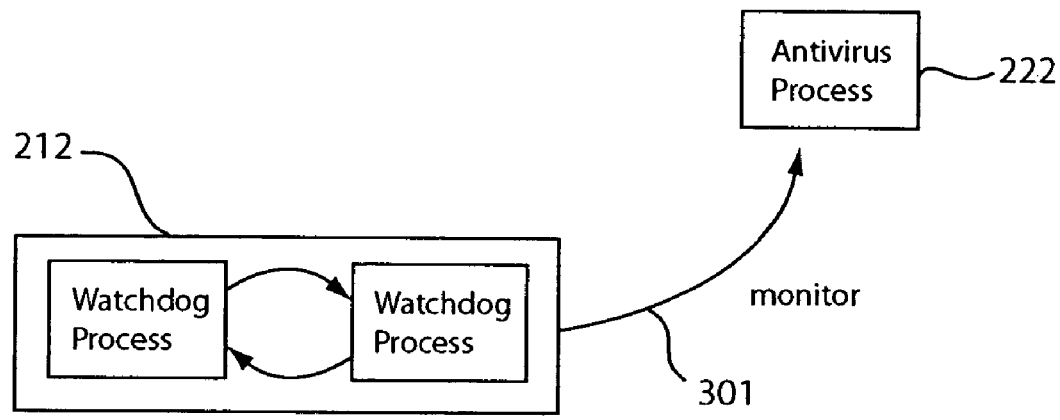
FIGS. 3A-3F pictorially illustrate a technique for protecting a process running in a computer in accordance with an embodiment of the present invention.

In FIG. 3A, watchdog processes 212, which mutually protect each other as described above, periodically monitor the state of an antivirus process 222. The antivirus process 222 is the designated protected process in this example. In one embodiment, watchdog processes 212 identify the antivirus process 222 by process ID and continually check to ensure that the process ID is still up and running.

Figure 3B:
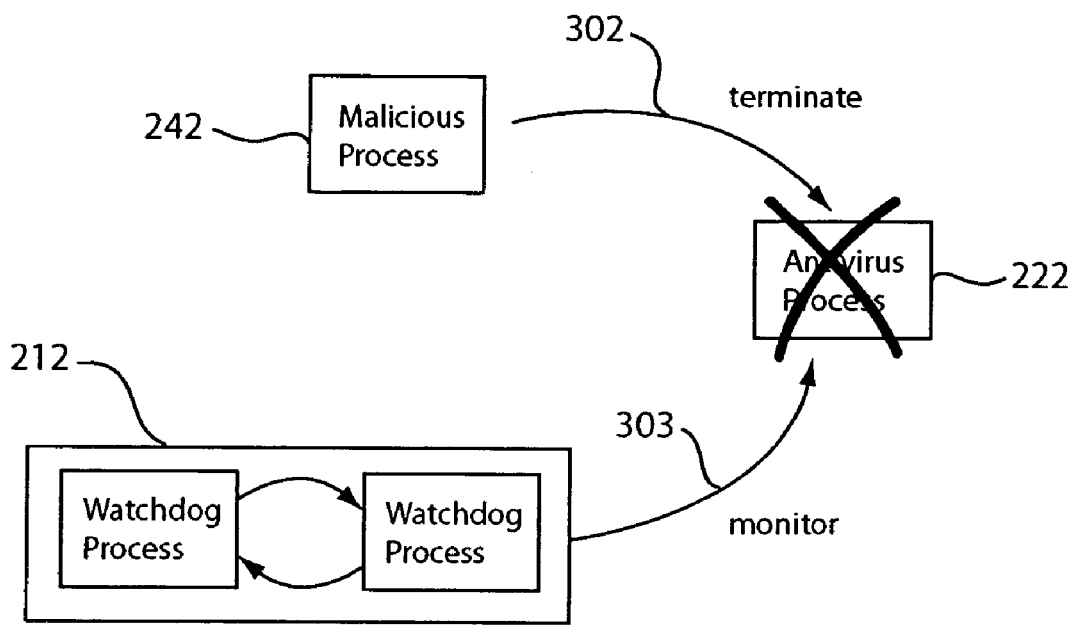

In FIG. 3B, a malicious process 242 terminates the antivirus process 222 (see arrow 302). Thereafter, the next time watchdog processes 212 check on the antivirus process 222, watchdog processes 212 discover that the antivirus process 222 has been abnormally terminated (see arrow 303). That is, watchdog processes 212 discover that the antivirus process 222 is no longer running without receiving a notification from the antivirus process 222 that it is normally closing.

Figure 3C:
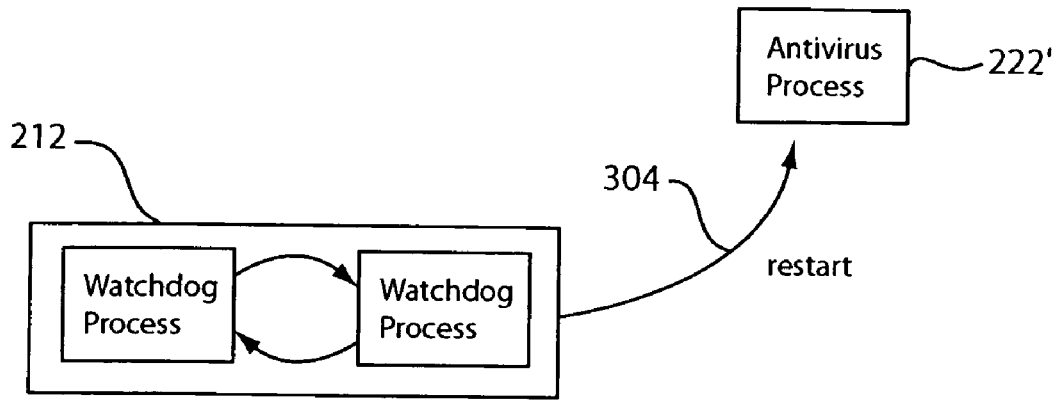

In FIG. 3C, watchdog processes 212 restart the antivirus process (see arrow 304), which is now labeled as 222' to indicate that it has been restarted once. In one embodiment, watchdog processes 212 restart a protected process that has been abnormally terminated less than or equal to (or just less than, depending on implementation) a specified threshold before initiating actions to identify and terminate a possible malicious process. This helps decrease false positives, and takes into account the possibility that the abnormal termination of the protected process may be due to events other than a malicious process. For example, watchdog processes 212 may restart an antivirus process 222 at least once before looking for a malicious process.

Figure 3D:
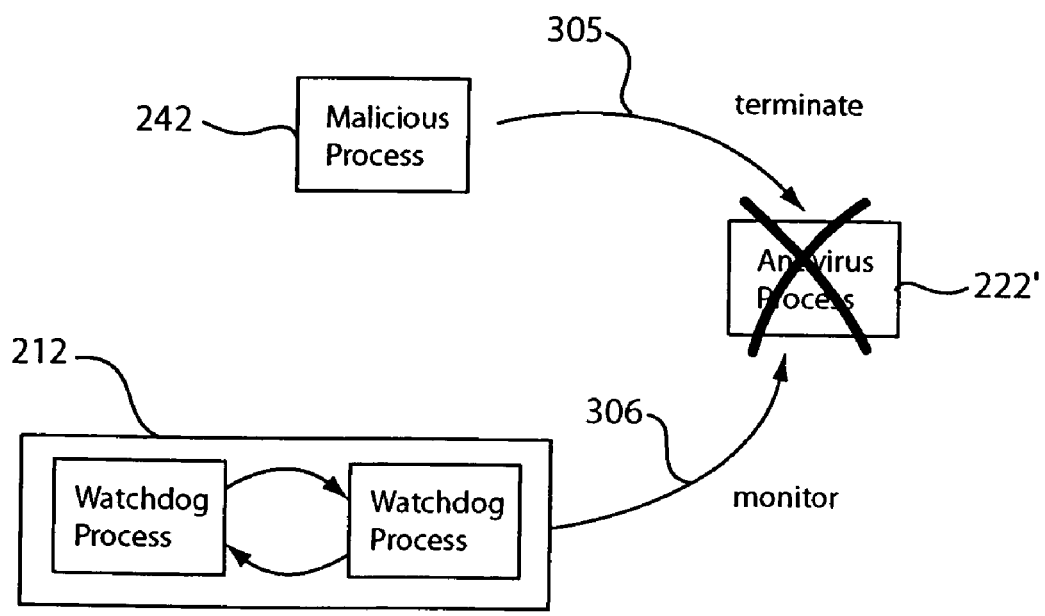

In FIG. 3D, the malicious process 242 terminates the antivirus process 222' (see arrow 305). Again, watchdog processes 212 find the antivirus process 222' abnormally terminated (see arrow 306). In one embodiment, watchdog processes 212 presume that a malicious process is running in the computer if a protected process has been abnormally terminated a number of times exceeding (or at least equal to, depending on implementation) a threshold value. The threshold value may take into account the number of times the protected process has been abnormally terminated, the time between terminations, or both. For example, the threshold may be 2 abnormal terminations per hour.

Figure 3E:
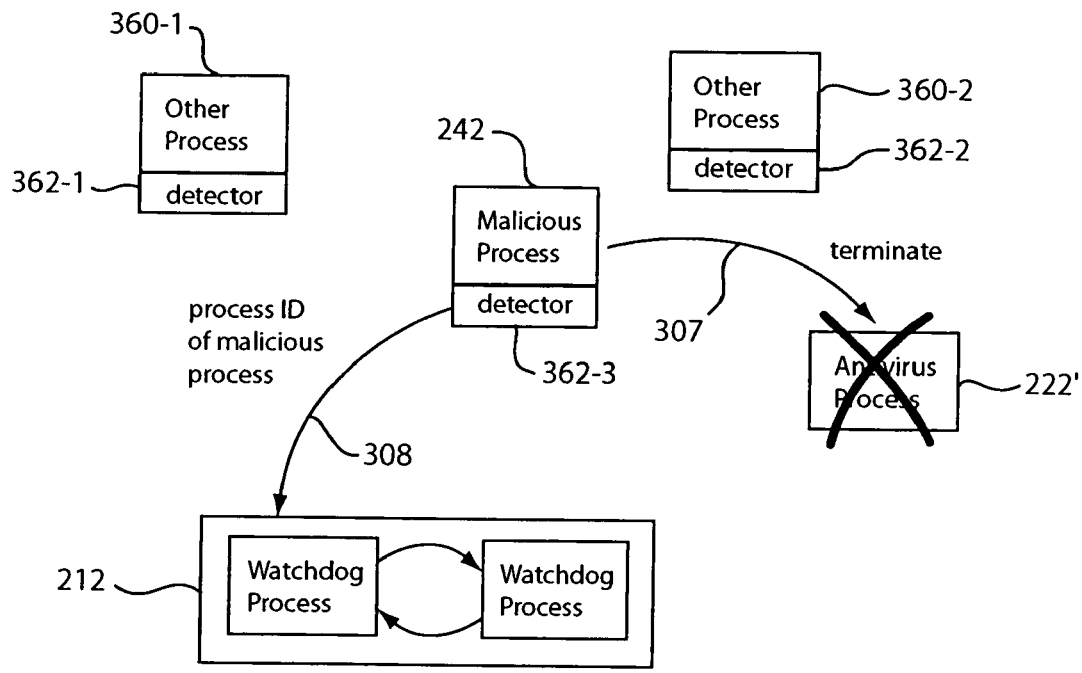

In FIG. 3E, watchdog processes 212 inject a detector 362 (i.e., 362-1, 362-2, ...) in all other running processes in the computer. It should be noted that injecting techniques, in general, are well known in the Microsoft Windows™ operating system environment. Other techniques for monitoring the activities of processes may also be used without detracting from the merits of the present invention. In the example of FIG. 3E, a detector 362 is injected in malicious process 242 and other processes 360 (i.e. 360-1, 360-2, ...). A detector 362 monitors the activities of the injected process. In one embodiment, a detector 362 detects if the injected process terminates the protected process. In the Microsoft Windows™ operating system environment, a detector 362 may hook to the application programming interface (API) "TerminateProcess(pid)," which terminates a process having the process ID "pid." A detector 362 may detect all calls to "TerminateProcess(pid)" and compare the parameter "pid" to that of the protected process. If the "pid" matches that of the protected process, meaning the injected process is terminating the protected process, the detector 362 may so notify watchdog processes 212 and provide watchdog processes 212 the process ID of the injected process terminating the protected process. This allows watchdog processes 212 to terminate the injected process before restarting the protected process once again. Depending on implementation, a detector module 362 may notify watchdog processes 212 after the malicious injected process terminates the protected process one or more times.

In FIG. 3E, malicious process 242 terminates the antivirus process 222' (see arrow 307). Detector 362-3 accordingly notifies watchdog processes 212, and provides watchdog processes 212 the process ID of malicious process 242 (see arrow 308). Watchdog processes 212 may use the process ID of malicious process 242 to terminate it. For example, in the Microsoft Windows™ operating system environment, watchdog processes 212 may call the API "TerminateProcess(pid)" using the process ID of malicious process 242 in the parameter "pid." Note that this technique may be employed to identify and terminate one or more malicious processes.

Figure 3F:
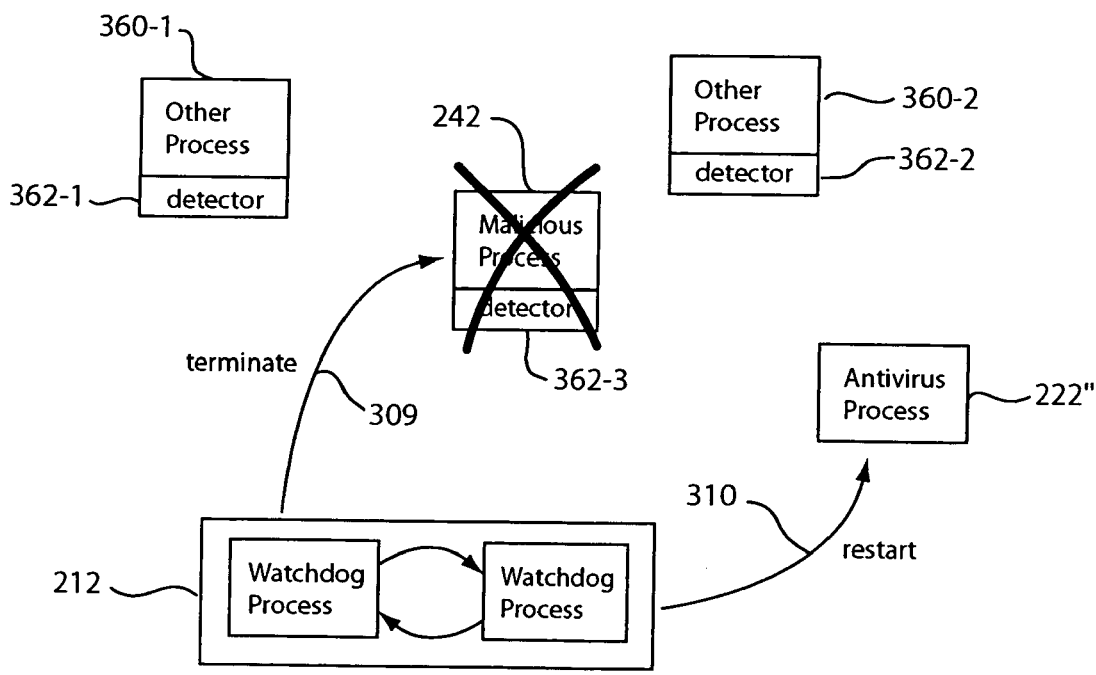

In FIG. 3F, watchdog processes 212 terminate malicious process 242 (see arrow 309). Thereafter, watchdog processes 212 restart the protected antivirus process, which is now labeled as 222" to indicate that it has been restarted twice.

Figure 4:
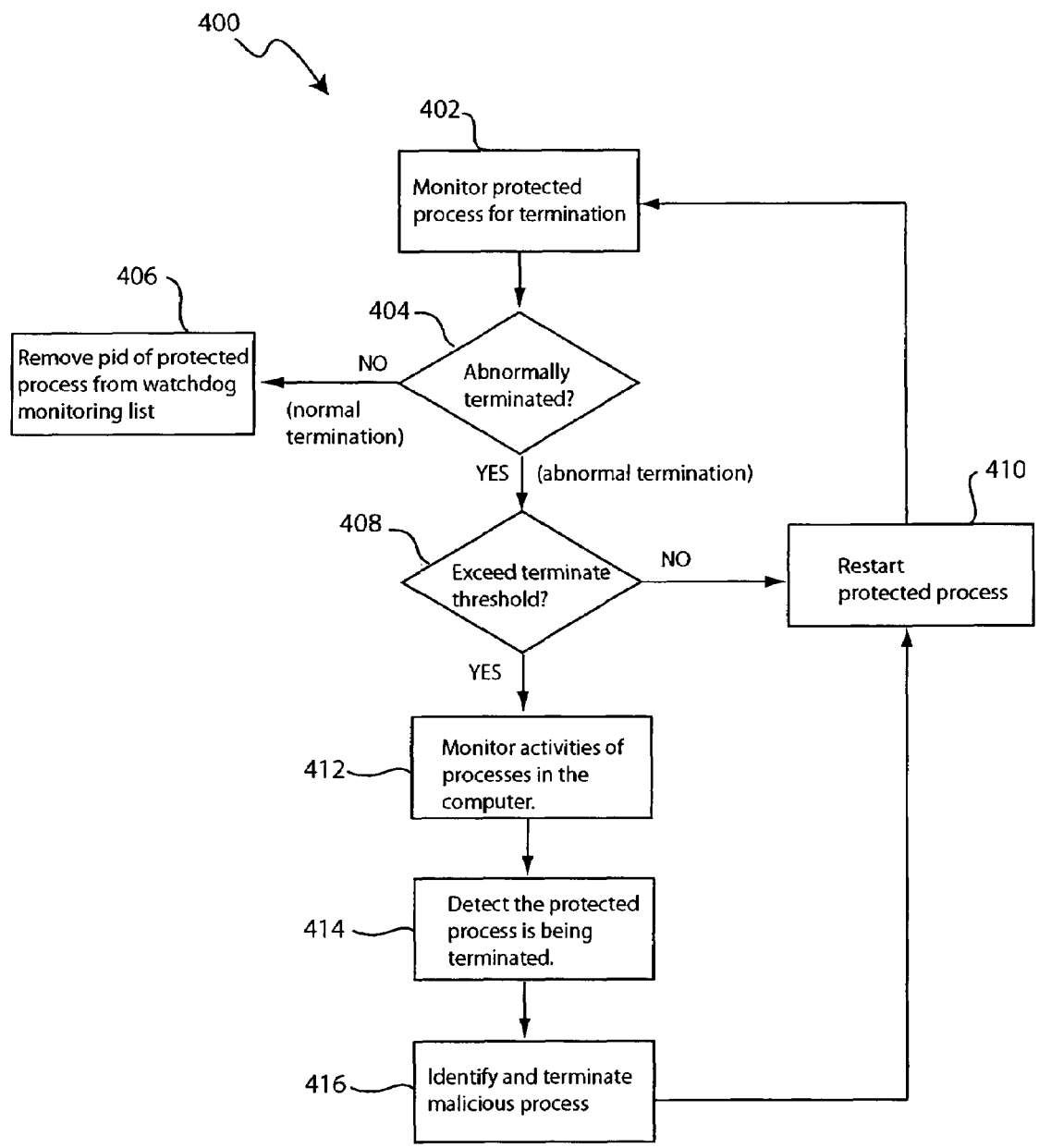
FIG. 4 shows a flow diagram of a method of protecting a process running in a computer, in accordance with an embodiment of the present invention.

FIG. 4 shows a flow diagram of a method 400 of protecting a process running in a computer, in accordance with an embodiment of the present invention. Beginning in step 402, a watchdog process monitors a protected process for termination. Depending on implementation, two or more watchdog processes that mutually protect each other may be employed. The protected process may be an antivirus process or other types of processes. Method 400 continues to step 404 if the protected process is terminated.

In the path from step 404 to step 406, the protected process has been normally terminated (e.g., closed by the user). In that case, the protected process will no longer be monitored by the watchdog process. In one embodiment, step 406 is performed by removing the process ID of the protected process from a watchdog monitoring list.

In the path from step 404 to step 408, the watchdog process discovers that the protected process has been abnormally terminated. In step 408, the watchdog process determines if the protected process has been abnormally terminated a number of times exceeding (or at least equal to, depending on implementation) a terminate threshold. If the protected process has been abnormally terminated a number of times not exceeding the terminate threshold, the watchdog process may restart and continue monitoring of the protected process as indicated in steps 410 and 402. If the protected process has been abnormally terminated a number of times exceeding the terminate threshold, method 400 continues in step 412 to initiate detection and removal of the process terminating the protected process.

In step 412, the watchdog process monitors the activities of processes running in the computer. Depending on implementation, the watchdog process may monitor all or selected processes. In one embodiment, the watchdog process injects a detector in all other processes. The detector listens for activities of the injected process, such as calls to an API that terminates or kills the protected process.

In step 414, the detector detects that the injected process is terminating the protected process. For example, the detector may detect that the injected process, hereinafter the "malicious process," is calling an API that terminates a process having a process ID corresponding to that of the protected process.

In step 416, the detector identifies the malicious process to the watchdog process. For example, the detector may provide the watchdog process the process ID of the malicious process. Accordingly, the watchdog process terminates the malicious process and restarts the protected process as indicated in the path from step 416 to step 410 to step 402.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting a protected process running in a computer, the method comprising:
    monitoring a protected process running in a computer;
    detecting abnormal termination of the protected process;
    monitoring activities of a plurality of processes running in the computer in response to detecting abnormal termination of the protected process; and
    identifying a malicious process in the plurality of processes terminating the protected process.

2. The method of claim 1 wherein the protected process is monitored and protected by a plurality of watchdog processes that protect one another.

3. The method of claim 1 wherein monitoring the activities of the processes running in the computer comprises:
    injecting a detector to each of the processes, the detector listening for an activity that terminates the protected process.

4. The method of claim 3 wherein identifying the malicious process comprises detecting an activity terminating the protected process.

5. The method of claim 4 wherein the activity comprises a call to an application programming interface (API) that terminates the protected process.

6. The method of claim 5 further comprising:
    providing a process ID of the malicious process to a watchdog process protecting the protected process.

7. The method of claim 1 wherein the protected process comprises an antivirus process.

8. The method of claim 1 wherein the watchdog process restarts the protected process at least once after an abnormal termination before initiating identification of the malicious process.

9. A method of protecting a protected process running in a computer, the method comprising:
    detecting abnormal termination of the protected process;
    in response to detecting abnormal termination of the protected process, injecting a detector in a plurality of processes running in the computer, the detector being configured to listen for a call to terminate the protected process;
    restarting the protected process;
    detecting the call to terminate the protected process;
    identifying a malicious process in the plurality of processes making the call to terminate the protected process; and
    terminating the malicious process.

10. The method of claim 9 wherein the malicious process is terminated by a pair of watchdog processes that detect the abnormal termination of the protected process, the pair of watchdog processes being configured to protect each other from abnormal termination.

11. The method of claim 9 wherein abnormal termination of the protected process is detected more than once before the detector is injected in the processes running in the computer.

12. The method of claim 9 further comprising:
   restarting the protected process after termination of the malicious process.

13. The method of claim 9 wherein the protected process comprises an antivirus process.

14. A method of protecting a protected process running in a computer, the method comprising:
   detecting abnormal termination of the protected process;
   injecting a detector in processes running in the computer, the detector being configured to listen for a call to terminate the protected process;
   restarting the protected process;
   detecting the call to terminate the protected process;
   identifying a malicious process making the call to terminate the protected process; and
   terminating the malicious process;
   wherein detecting the call to terminate the protected process comprises hooking to an application programming interface (API) and identifying a process ID provided as a parameter to the API.

* * * * *